Dec. 14, 1937.      J. SEITZER      2,102,135

CHAIN COUPLING

Filed April 13, 1937

Inventor

John Seitzer

By Clarence A. O'Brien
Hyman Berman
Attorneys

Patented Dec. 14, 1937

2,102,135

UNITED STATES PATENT OFFICE 2,102,135

CHAIN COUPLING

John Seitzer, Clarkia, Idaho

Application April 13, 1937, Serial No. 136,661

2 Claims. (Cl. 24—116)

My invention relates to improvements in chain couplings, and the primary object thereof is to provide a reliable coupling of few parts and inexpensive construction for securely attaching the ends of link chains together, particularly the chain side members of automobile non-skid chains.

To the accomplishment of the above and subordinate objects presently appearing, a preferred embodiment of my invention has been illustrated in the accompanying drawing, set forth in detail in the following description, and defined in the claims appended hereto.

Figure 1:
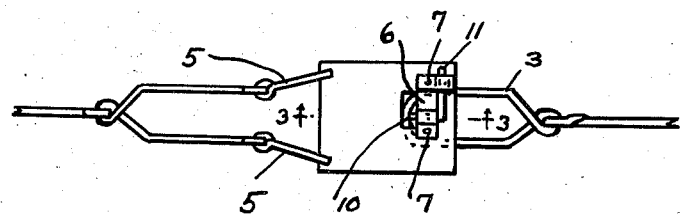
Figure 1 is a view in side elevation of my improved chain coupling.
Figure 2:
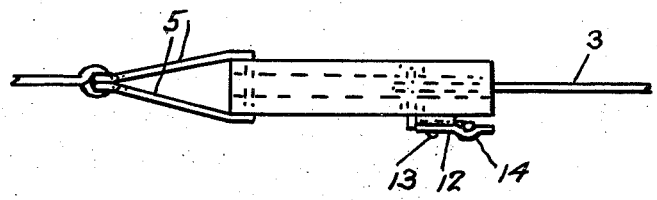
Figure 2 is a plan view.
Figure 3:
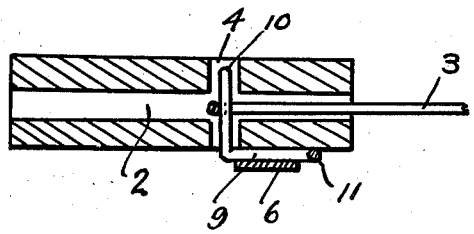
Figure 3 is a view in longitudinal section taken on the line 3—3 of Figure 1 looking in the direction indicated by the arrows, and drawn to an enlarged scale.
Figure 4:
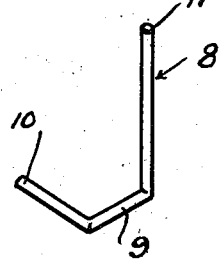
Figure 4 is a perspective view of a coupling bar forming part of the coupling.

Referring to the drawing by numerals, the illustrated embodiment of my invention comprises a block-like coupling member 1, preferably of flat oblong form, provided with a central longitudinally extending through slot 2 of oblong shape transversely designed to receive the end of a link 3 for instance of the side stretch of the usual non-skid automobile chain. Adjacent one end said member 1 is provided with a transverse slot 4 bisecting the slot 2. Adjacent its opposite end the coupling member 1 has pivotally secured thereto, in any suitable manner, a pair of opposed links 5 for the attachment of the other end of the chain thereto. Alongside the slot 4 is a bearing bracket 6 of strap-like metal suitably secured to the coupling member 1 as by screws or bolts 7. A coupling bar 8 is swingably mounted in said bearing bracket 6 adjacent one end of the slot 4 for movement about an axis at a right angle to the slot 4. The coupling bar 8 comprises an intermediate shank portion 9 journaled in said bracket 6, a coupling end 10 extending at a right angle to the shank portion 9, and a hand grip end 11 extending at a right angle to said shank portion and said coupling end, the arrangement being such that the hand grip end may be swung in one direction flat against the member 1 to swing the coupling end 10 into the slot 2 to extend across the slot 2 and through the loop of the link 3, whereby removal of said link from the member 1 is blocked, as will be clear. Contrariwise, when the hand grip end 11 is similarly swung in the opposite direction, the coupling end 10 is swung out of the slot 4 to release the link 3. It will of course be understood that the slot 4 and the coupling end 10 are properly proportioned so that the latter may swing into and out of the slot 4 and extend through the link 3 and across the slot 2 without projecting at its free end out of the slot 4.

The coupling bar 8 is latched against movement to releasing position by a clip 12 pivoted, as at 13, on the bracket 6, and having a socketed end 14 adapted to snap over the hand grip end 11 of the coupling rod 8. When it is desired to swing the coupling rod 8 to releasing position, the clip 12 may be swung in either direction from over the hand grip end of said bar.

The construction, operation, and advantages of my invention will, it is believed, be clear from the foregoing description thereof.

Manifestly, modifications in minor details described and relation of parts may be resorted to without departing from the inventive concept, and right is herein reserved to all such modifications falling within the scope of the claims appended hereto.

What I claim as new is:

1. A coupling for securing the ends of a chain together comprising an elongated block-like coupling member having a longitudinal through slot therein for receiving one end of a link of a chain and a transverse slot bisecting the horizontal slot, a coupling bar having a hand grip end and a coupling end and swingably mounted on said block for manipulation to swing said coupling end into and out of said transverse slot and through said link, a latch cooperating with said hand grip end to block swinging movement of said coupling end out of said slot, said latch being pivotally mounted for snap action engagement with said hand grip end.

2. A coupling for securing the ends of a chain together comprising an elongated block-like coupling member having a longitudinal through slot therein for receiving one end of a link of a chain and a transverse slot bisecting the horizontal slot, a right angled coupling bar having a hand grip end and a coupling end and swingably mounted on one side of said block for manipulation into coupling and uncoupling positions, respectively, said coupling end in the coupling position of the bar extending into the transverse slot and through said link, and said hand grip end in said coupling position of the bar engaging flat against said side of the block, and a pivoted latch on said block adapted to be swung over said hand grip end with a snap action in the coupling position of said bar.

JOHN SEITZER.